Figure 1:
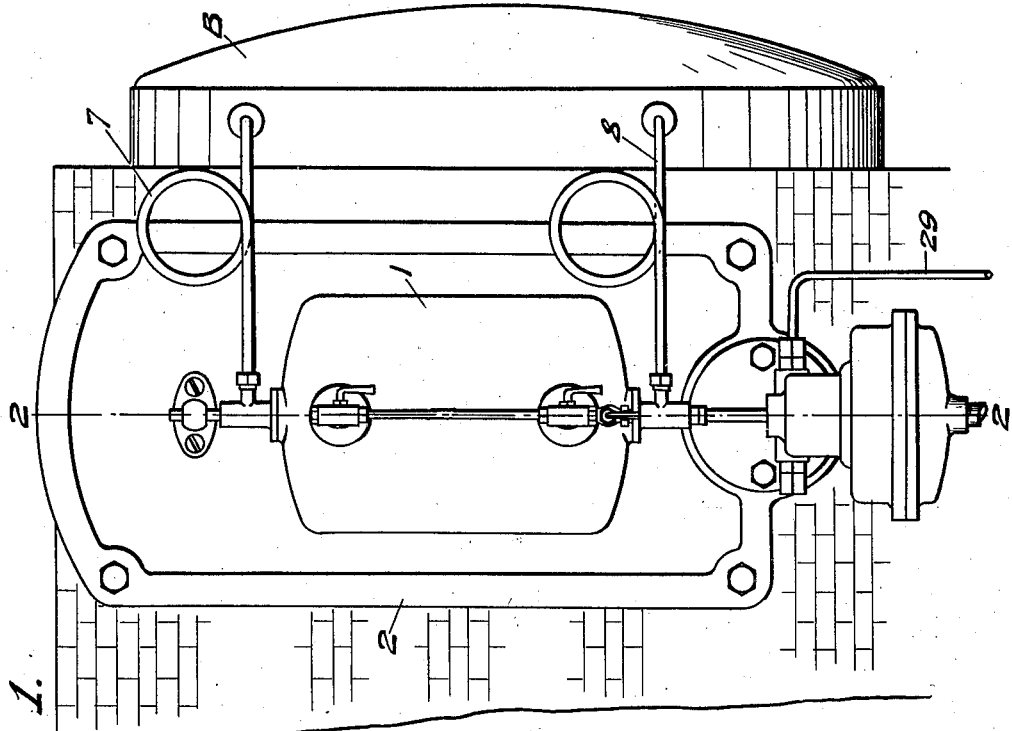

March 9, 1926. 1,575,816

R. CARLSTEDT

LIQUID LEVEL REGULATOR

Filed June 10, 1924 2 Sheets-Sheet 1

Inventor
Ragnar Carlstedt
By Wm. T. Hedlund
his Attorney

March 9, 1926. 1,575,816
R. CARLSTEDT
LIQUID LEVEL REGULATOR
Filed June 10, 1924 2 Sheets-Sheet 2

Inventor
Ragnar Carlstedt
By Wm J. Aedlund
his Attorney

Patented Mar. 9, 1926.

1,575,816

UNITED STATES PATENT OFFICE.

RAGNAR CARLSTEDT, OF STOCKHOLM, SWEDEN, ASSIGNOR, BY MESNE ASSIGNMENTS, TO ARCA REGULATORS, INCORPORATED, OF NEW YORK, N. Y., A CORPORATION OF VIRGINIA.

LIQUID-LEVEL REGULATOR.

Application filed June 10, 1924. Serial No. 719,219.

*To all whom it may concern:*

Be it known that I, RAGNAR CARLSTEDT, a subject of the King of Sweden, residing at Stockholm, Sweden, have invented certain new and useful Improvements in Liquid-Level Regulators; and I do hereby declare the following to be a full, clear, and exact description of the invention, such as will enable others skilled in the art to which it appertains to make and use the same, reference being had to the accompanying drawings, which form a part of this specification and wherein like reference characters represent like parts.

My invention relates to an apparatus for controlling the level of liquid in vessels, particularly vessels under pressure and more specifically my invention relates to the regulation of feed water to boilers.

The purpose of my invention is to provide a liquid level regulator which will maintain a fixed level of water and which is extremely sensitive to small variations of water level.

In the preferred form, the invention consists in a receptacle suspended outside of and connected with the vessel in which the level of liquid is to be controlled, which receptacle is mounted on a frictionlessly movable mechanism, preferably including a lever, which controls outflow of a stream of liquid, the control of the outflow of liquid effecting changes of liquid pressure which are utilized to operate a valve. The invention will be readily understood by reference to the accompanying drawings showing several embodiments thereof.

Figure 2:
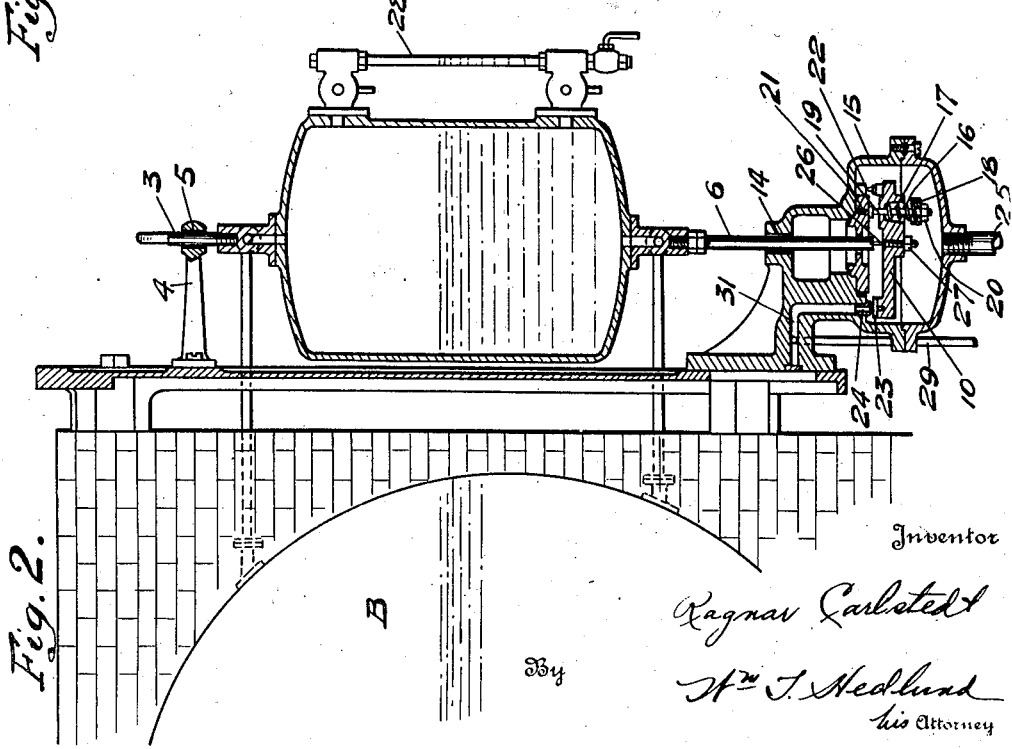
Figure 3:
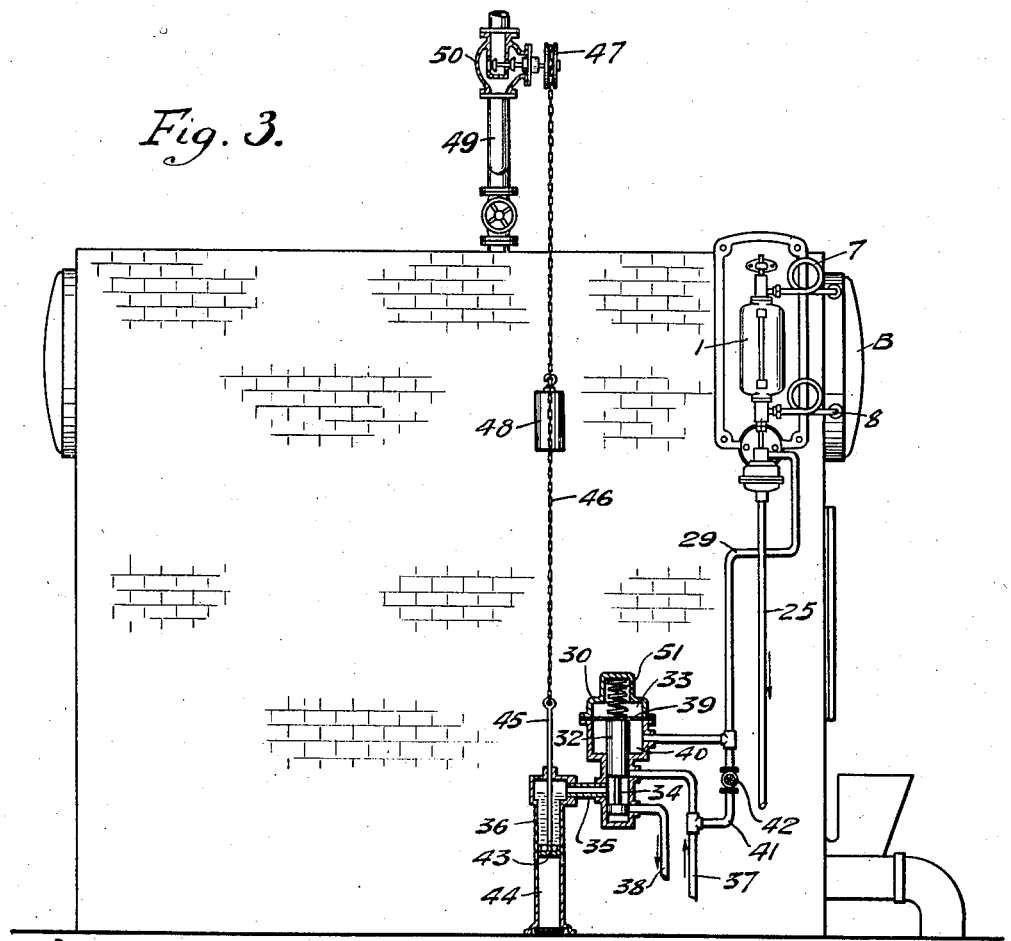
Figure 4:
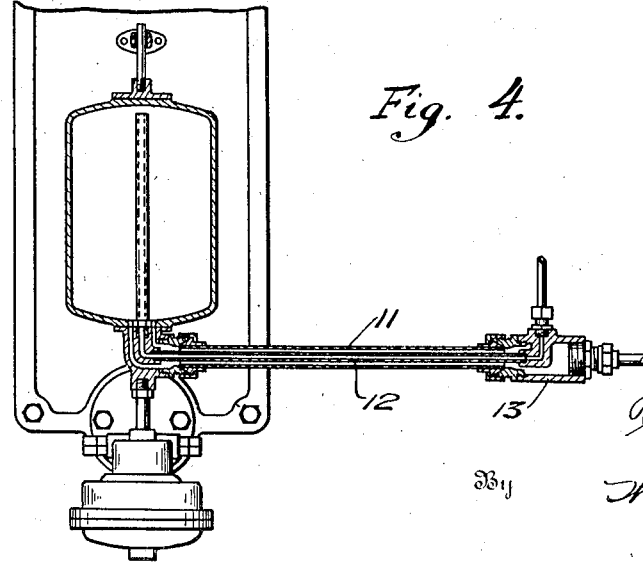

In the accompanying drawings Fig. 1 is an elevation of a suspended receptacle according to my invention for regulating the liquid level in a boiler; Fig. 2 is a section through the same on a line 2—2 Fig. 1; Fig. 3 is an organization view showing a boiler together with a feed water supply conduit and my regulator connected therewith. Fig. 4 shows one manner of connection between the suspended receptacle and the boiler.

While I am illustrating my invention as applied to a boiler, it is to be understood that the invention is not limited to the control of liquid level in boilers, although particularly adaptable to this use. The invention may be applied to the control of liquid level in any vessel.

The receptacle 1 is mounted outside the boiler on a panel 2. Attached to the top of the receptacle is a guide pin 3 which passes through a support 4 through a hole 5. This hole 5 is considerably larger than the outside diameter of pin 3 so that there is little or no friction between the pin and the support. Attached to the bottom of the receptacle 1 is a guide pin 6 which rests on a relay lever 10.

The suspended receptacle 1 is connected to the steam space of the boiler 9 by means of the upper pipe 7 and and is connected to the water space of the boiler by means of lower pipe 8. These pipes are shown as having loops in them which make the same elastic. By this means the suspended receptacle may have free movement with respect to the boiler drum without strain on the connecting pipes. These pipes constitute an elastic connection between the suspended receptacle and the boiler. The connection may be arranged as shown in Fig. 4 wherein concentric pipes 11 and 12 are used, which extend between the receptacle and a coupling member 13, from which separate pipes lead to the steam and water spaces of the boiler. The inner of the concentric pipes extends to the upper part of the suspended receptacle and the outer is connected to the bottom of the receptacle. By this means the water level in the suspended receptacle and the boiler are the same. In this case also the pipe connection must be resilient and for this reason suspended receptacle 1 is placed at some distance from the coupling member 13. In certain cases it is preferable to make the concentric pipes 11 and 12 oval in cross section thereby giving greater resiliency for a given length.

The suspended receptacle preferably rests directly on relay lever 10 as shown in Fig. 2. This lever is situated in a relay housing 15. Pin 6 passes through a large hole 14 in the relay housing, so constructed that there is no frictional contact between the pin and the sides of the hole. Lever 10 is pressed upwards against the gravitational force of the suspended receptacle by means of a spring 16 situated in a well 17, in turn bearing against a spring retaining member 18 held in place by stud bolt 19 and nut 20. Stud bolt 19 is secured to the relay housing as indicated at 21. The spring 16 acts upon the relay lever at a point intermediate the point of application of the force due to the suspended receptacle and point bearings indicated at 22. There are two of these point bearings, one on each side of the relay arm, forming a knifelike frictionless bearing. At the opposite end of the relay lever is a baffle plate 23 which controls a nozzle opening 24, through which a continuous flowing stream of liquid discharges into the relay housing. This continuous stream of liquid leaves the relay housing by means of waste conduit 25. Relay lever 10 pivots about the point bearings 22 and is operated by means of the weight of water in the suspended receptacle to vary the discharge through nozzle opening 24, thereby controlling a valve in the feed water conduit as hereinafter set forth. Preferably pin 6 does not rest directly on the relay lever but upon a central pin 26, passing therethrough and screw threaded therein and adjustable by means of nut 27. 28 designates a gage glass to indicate the height of the water in the suspended receptacle 1.

By this arrangement a frictionless mechanism is produced which controls a stream of pressure liquid in response to variations of liquid level in such a manner that small variations of liquid level effect great variations of pressure in this small stream. The variations of pressure in this small stream can then be utilized to control a feed water valve in a variety of ways. The only possibility of any friction is by the side contact on pin 3 with the hole in support 4, but since there is no force exerted in a horizontal direction this friction is negligible.

In Fig. 3 I have shown the manner in which the variations in the pressure in the small stream of liquid issuing out of the nozzle opening 24 can be utilized to control a feed water valve. In Fig. 3, pipe 29 conducts liquid from an actuating means 30 to the relay housing and connects with the passage 31 in the relay housing leading to the nozzle opening 24. The actuating means 30 comprises a pilot valve 32 movable in a housing 33. The pilot valve is recessed as indicated at 34 and upon movement, connects a pipe 35 leading to servo-motor 36, either with a supply conduit 37 connected to a source of liquid under pressure or with a discharge conduit 38 which may connect with atmosphere. Attached to the pilot valve 32 is a diaphragm 39 so arranged that a diaphragm chamber 40 is formed adjacent the same. A spring 51 acts on the pilot valve to oppose the pressure in diaphragm chamber 40. Pipe 29 connects with this chamber.

Branched off the supply conduit 37 is a branch conduit 41 connecting with pipe 29. This branch conduit 41 has a restriction 42 in the same, a hand valve being shown by way of illustration for this purpose, the purpose of the same being to enable pressure changes to occur in pipe 29 and chamber 40 when the jet flowing through the nozzle opening 24 is suppressed or enlarged. The restriction 42 must therefore be of less cross section than the normal discharge opening between the nozzle and the baffle plate 23.

The servo-motor 36 comprises a piston 43, mounted in cylinder 44 and piston rod 45 attached to the piston. A chain 46 is connected to the end of the piston rod and passes over a sprocket 47 attached to the spindle of feed valve 50. At the other end of the chain is a counter weight 48. Feed valve 50 controls the flow of water through feed conduit 49 to the boiler.

The operation of the device is as follows:—

Suppose the water level in the boiler rises. The water level in the boiler is the same as that in the suspended receptacle 1 and the water level in the suspended receptacle rises correspondingly due to the elastic connections between the suspended receptacle 1 and the boiler. The suspended receptacle 1 being thus increased in weight will produce a greater force, acting down on relay lever 10 against the action of spring 16. This increased force moves the baffle plate 23 farther away from the nozzle opening 24, thus increasing the flow of liquid through the same, which is being supplied through supply conduit 37, branch conduit 41, pipe 29 and passage 31. Due to the restriction 42 an increased flow through the nozzle opening 24 causes a decreased pressure in passage 31, pipe 29 and diaphragm chamber 40. The decreased pressure in diaphragm chamber 40 causes a downward movement of the pilot valve since the action of spring 51 then preponderates over the upward pressure on diaphragm 39. This downward movement of the pilot valve causes communication to be effected between the piston cylinder 44 and discharge conduit 38, thus allowing liquid to pass from the cylinder 44 to drain. The piston 44 then moves upwardly due to the action of counter weight 48, and the sprocket 47 is moved in a clockwise direction closing more or less the feed valve 50, thus decreasing the flow of water to the boiler and causing the water level to return to normal.

Suppose on the contrary the water level in the boiler falls. The water level in the suspended receptacle will then also fall and its weight being thereby decreased, spring 16 will operate to move the relay lever in a clockwise direction, the movement, however, being very small. By this means the stream of liquid flowing through the nozzle opening 24 is diminished and consequently the pressure in diaphragm chamber 40 increased. This increase in pressure operates to move the pilot valve 32 to effect communication between the servo-motor and supply conduit 37. The servo-motor is thereby operated to rotate sprocket 47 in a counter-clockwise direction thus opening more or less the feed water valve.

While I have above described what I have found to be a very practical embodiment of my invention, it is obvious that various changes may be made in the form and relation of parts. The invention is not, therefore, limited to the precise details of construction and arrangement shown.

Having thus described my invention, what I claim is:—

1. A liquid level regulator comprising a valve, a continuously flowing stream of liquid to control said valve, and a movable receptacle to control said continuously flowing stream of liquid.

2. A regulator to control the liquid level in a vessel comprising a relay including a continuously flowing stream of liquid, a movable element to control said stream of liquid, a receptacle supported on said movable element and a valve controlled by said continuously flowing stream of liquid.

3. A regulator to control the liquid level in a vessel comprising a relay including a continuously flowing stream of liquid, a movable element to control said stream of liquid, a receptacle supported on said movable element, resilient connections between said receptacle and the vessel whereby changes on water level in the vessel cause changes in weight of the receptacle.

4. A liquid level regulator comprising a receptacle, a relay housing, a support, a pin on the upper side of said receptacle passing loosely through said support, a pin on the lower side of said receptacle passing loosely through said relay housing, a valve and means whereby movement of said receptacle controls said valve.

5. A liquid level regulator to control the liquid level in a vessel comprising a receptacle outside the vessel, resilient connections between the receptacle and the vessel whereby changes in liquid level in the vessel cause changes in weight of the receptacle, a relay housing, a support, supporting means for said receptacle having loose engagement with said support, and passing loosely through said relay housing, a continuously flowing stream of liquid, a movable element to control said stream of liquid, said movable element being moved in response to changes in weight of said receptacle and a valve controlled by said continuously flowing stream of liquid.

6. A liquid level regulator for a vessel comprising a valve, a liquid pressure operated servo-motor to control said valve, a liquid pressure operated actuating means to control said servo-motor, a movable element to indirectly control said actuating means, a receptacle connected to the vessel so that changes in water level in the vessel cause changes in weight of the receptacle, said receptacle being arranged to control said movable element.

7. A regulator to control the liquid level in a vessel comprising a relay housing, a continuously flowing stream of liquid in said housing, a lever to operate said stream, a loosely mounted receptacle supported on said lever, resilient connections between said receptacle and the vessel, and a valve operated by said continuously flowing stream of liquid.

8. In combination, a boiler, a feed water conduit for said boiler, valve mechanism to control the flow through said conduit, a continuously flowing stream of liquid to indirectly control said valve mechanism, a suspended receptacle situated outside of said boiler to control said stream of liquid, and resilient connections between said receptacle and said boiler whereby changes of water level in said boiler cause changes of water level in said receptacle.

9. In combination, a boiler, a feed water conduit for said boiler, valve mechanism to control the flow through said conduit, a liquid pressure operated servo-motor to control said valve mechanism, liquid pressure operated actuating means to control said servo-motor, a relay housing, liquid communication between said actuating means and said relay housing, a movable element in said relay housing to control said liquid communication, a receptacle situated outside said boiler at the water level thereof, means to support said receptacle on said movable element passing loosely through said relay housing, a support, means connected with said receptacle and passing loosely through said support, means to connect the upper part of said receptacle with the steam space of the boiler, and means to connect the lower part of said receptacle with the water space of the boiler.

In testimony whereof I hereunto affix my signature.

RAGNAR CARLSTEDT.